J. W. McClure,
Churn.
No. 103,219.   Patented May 17, 1870.
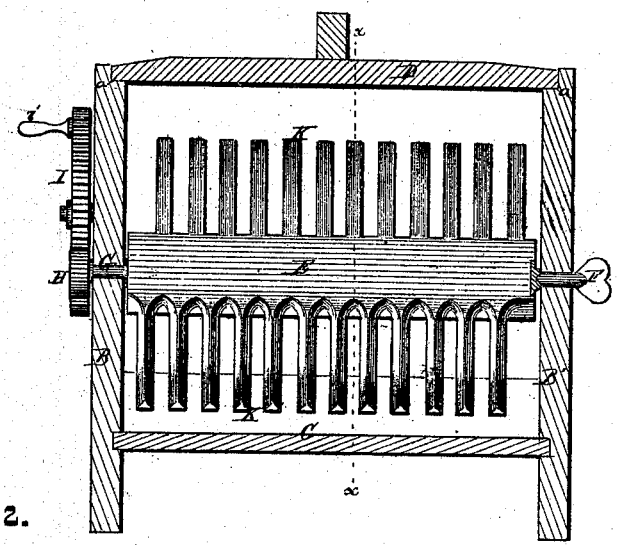
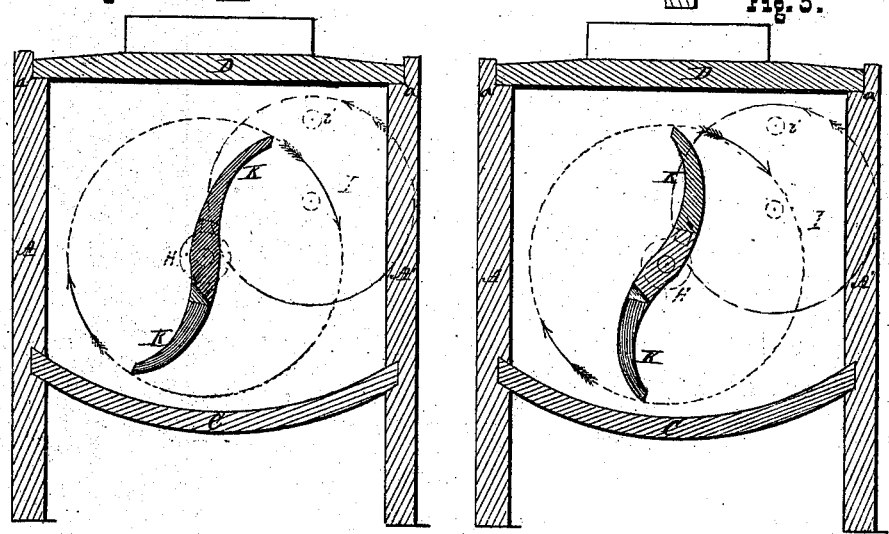
Witnesses.
Inventor.
Jacob W. McClure,
by Crindle & Dyer
Attys.

United States Patent Office.

JACOB W. McCLURE, OF JEFFERSON CITY, MISSOURI.

Letters Patent No. 103,219, dated May 17, 1870.

IMPROVEMENT IN CHURN-DASHERS.

The Schedule referred to in these Letters Patent and making part of the same.

To all whom it may concern:

Be it known that I, JACOB W. McCLURE, of Jefferson City, in the county of Cole and in the State of Missouri, have invented certain new and use Improvements in Churn-Dashers; and do hereby declare that the following is a full, clear, and exact description thereof, reference being had to the accompanying drawing making a part of this specification, in which—

Figure 1 is a vertical central longitudinal section of my improved churn;

Figure 2 is a vertical cross-section of the same, on the line $x\ x$ of fig. 1; and Figure 3 is a like view of a modification of the dasher.

Letters of like name and kind refer to like parts in each of the figures.

My invention is an improvement in churns having revolving dashers; and

It consists in the peculiar shape of the dasher, as is hereinafter set forth.

In the annexed drawing—

A and A' represent the sides, B and B' the ends, and C the curved bottom of an oblong box or churn, which parts are secured together in the usual manner, and the whole inclosed upon the upper side by means of a cover, D, fitting into and resting within a right-angled rabbet, $a$, extending around the upper inner corner of the side and end pieces.

Placed horizontally within the churn near the center, transversely, is a flat wooden bar, E, one end of which is pivoted upon the pointed end of a screw, F, while the opposite end is secured to or upon a short shaft, G, that, from thence, passes outward through the end piece B, and is provided with a toothed pinion, H, which meshes with and receives motion from a gear-wheel, I, said gear-wheel being pivoted upon the end of the churn, and provided with a projecting stud, $i$, by means of which it is operated.

Secured to and projecting radially from equidistant points upon the edges of the bar E is a series of arms, K, which, as seen in figs. 1 and 2, curve forward, and have their sides beveled in the same direction, so as to give to the front edge of each arm a wedge or knife-shape, while their rear sides are flat, and, transversely, stand at a right angle to the line of motion.

The arms being placed so that those of one series come opposite the spaces between those of the other series, the device is complete, and is operated as follows:

A suitable quantity of cream having been placed within the churn, the dasher is caused to revolve in the direction shown by the arrows in fig. 2, by which means the cream is forced, with much violence, through the wedge-shaped openings between the arms, breaking the sacks, and liberating the globules of butter, in a small fraction of the time usually required.

When all the butter has been liberated, it is quickly and thoroughly collected, by reversing the motion of the dasher, so as to present the broad edges of the arms.

In order that the butter may be more readily collected in one mass, it may be found advantageous to curve the arms in an opposite direction to those before described, or, as shown in fig. 3, with their sharp edges convex, and their broad edges concave, by which means the butter collected by the latter will naturally incline toward the center, and be more readily removed from the milk.

The especial advantages possessed by this device are, that, from the peculiar shape and construction of the dasher, the milk is subjected to greater friction than by other devices intended for a like purpose, and, thereby, the butter globules are more quickly and thoroughly broken, after which the reversing of said dasher causes the butter to collect in one mass with great rapidity.

Having thus fully set forth the nature and merits of my invention,

What I claim as new, and desire to secure by Letters Patent, is—

The hereinbefore-described churn-dasher, consisting of the curved wedge-shaped arms K, secured radially to or upon a shaft, substantially as and for the purpose shown.

In testimony that I claim the foregoing, I have hereunto set my hand this 25th day of April, 1870.

JACOB W. McCLURE.

Witnesses:
THOS. NALE,
ALLEN FRISBEE,